2,862,875

CONVERSION OF HYDROCARBONS WITH THE USE OF A KAOLIN COMPOSITE CATALYST

Jacque C. Morrell, Chevy Chase, Md.

No Drawing. Application April 30, 1953
Serial No. 352,278

12 Claims. (Cl. 208—119)

This application is a continuation-in-part of my application No. 79,526 filed March 3, 1949, now abandoned.

My invention relates to the treatment of hydrocarbons and more particularly to the treatment of heavier hydrocarbons to produce lighter hydrocarbons of lower boiling range suitable for motor fuels. It relates further to a catalytic process or method for improving the octane rating or anti-knock value of hydrocarbons within the motor fuel boiling range, including straight run, thermally and catalytically cracked gasolines. This latter process is commonly referred to as reforming.

More particularly my invention relates to catalytic cracking or more broadly the conversion of heavier hydrocarbons and reforming of lower boiling hydrocarbons especially petroleum distillates to produce high octane motor fuels as well as to the use of special catalysts to accomplish these purposes.

In one of its specific aspects my invention relates to the use of special compound hydrocarbon conversion and reforming catalysts which comprise a major proportion of a base consisting essentially of an active silicate or hydrosilicate of aluminum specifically known as kaolin and sometimes referred to as kaolinite or china clay (which can be classified as a catalyst material tending towards scission or splitting of the carbon to carbon bond in hydrocarbons as well as isomerization) on the one hand admixed with or containing a catalytic material consisting of titanium oxide ($TiO_2$), and having both cracking and cyclization properties. The titanium oxides preferably of the activated gel or hydrogel like type which may be stabilized by the kaolin and is an active dehydrogenation and cyclization catalyst particularly in gel form. Titanium oxide as pointed out appears to have in addition to these properties that of breaking the C—C bond and therefore is a cracking catalyst as well as a dehydrogenation and cyclization catalyst when admixed directly with kaolin. In this respect, the titanium oxide serves a double purpose.

Kaolin sometimes referred to as china clay (and having a general formula $Al_2O_3 2SiO_2 2H_2O$) is a unique material found in large quantities in nature. It is readily distinguishable from and has definite advantages over other minerals having similar constituents but totally different properties. It is unique among the so-called clays in its degree of plasticity and hardening properties and it shows a crystalline X-ray structure whereas the others are generally amorphous. It is also within the purview of my invention to utilize activated kaolin i. e. the natural material treated with various reagents.

My catalysts specifically include a sufficient amount of the components such as kaolin to cause scission or cracking and isomerization and at the same time or in proper sequence contain titanium oxide as a dehydrogenation and cyclization catalytic component. My catalysts may be prepared in a variety of ways and may cover a wide range of compositions in various admixtures in accordance with the above principles. Generally, the active oxide of titanium (alone or in admixture with the oxides of chromium, molybdenum, vanadium, in gel form) may be deposited upon the carriers from aqueous solutions or they may be precipitated upon or admixed mechanically with the kaolin either in the wet or dry condition. It is to be pointed out particularly that the kaolin serves the additional purpose of preventing the gel oxides from crystalizing in which latter form they are much less effective. None of the catalysts are equivalent.

It is to be noted that I take advantage of certain properties of these various catalyst components in connection with my invention. Also, as will be shown clearly in the following explanation of my invention my compound catalysts achieve results of a very desirable and unique character which the use of neither of these catalyst components kaolin and titanium oxide could achieve either as regards yields or quality of products. This is in part due to the cooperative as well as the selective action of the various components of my catalysts upon the hydrocarbons, and their intermediate products undergoing treatment to produce certain desirable low boiling components of motor fuel having much higher octane value than would otherwise be the case as well as preventing the formation of certain undesirable components which otherwise would be formed.

Cracking is generally considered as the breaking down of higher into lower boiling hydrocarbons but this action is accompanied by complete decomposition to some extent into carbon and hydrogen on the one hand and by polymerization of the lower into higher boiling hydrocarbons on the other hand with perhaps some isomerization and hydrogenation.

With cracking catalysts of the kaolin type these reactions may occur, but to a greatly modified extent particularly showing less decomposition to carbon and hydrogen and more isomerization as well as more selective splitting and less gas formation, than thermal cracking. All of these reactions are in the desirable direction. This type of catalyst also produces a selective tendency towards polymerization and in general the products of catalytic cracking are quite different from those of pyrolytic cracking. However, different hydrocarbons as well as different members of the same series of hydrocarbons act differently under the influence of various catalysts, for example, with cracking catalysts normal octenes show extensive isomerization to iso-octenes as well as cracking to isobutene and isobutane whereas normal octane requires higher temperatures for conversion and produces more straight chain paraffinic hydrocarbons such as pentanes, hexanes, heptanes, etc. In both cases less methane, ethane, ethylene, etc. are produced than by pyrolytic cracking, however the octanes produce more than the octenes.

Cetene with sixteen carbon atoms first isomerizes and then cracks with subsequent isomerization of the lower boiling hydrocarbons whereas cetane the corresponding paraffinic hydrocarbon cracks down largely to gases such as propane and butanes and corresponding paraffins such as pentanes, and the gasoline boiling range products contains a large amount of paraffinic or straight chain hydrocarbons all of which is undesirable in contrast to the products from cetene which showed less gases and the liquids were largely branched chain. My invention eliminates these undesirable reactions and products by a proper direction and selectivity of reactions and products.

In my process the presence of a positive hydrogenation and cyclicizing component in the conversion catalyst i. e. titanium oxide (or mixtures of the same with the oxide gels referred to above), causes a selective dehydrogenation of the paraffinic hydrocarbons instead of scission and decomposition which would result if only kaolin were present. On the other hand, the latter stabilizes the activity of the titanium and other metal oxides where present and prevent them from crystallizing and becoming inactive. The stability of my catalyst under heat and other conditions is one of its unique characteristics, as titanium oxide is much more stable in this respect than the other oxides referred to. Furthermore, the kaolin compound is necessary in the mixture for controlled scission of the C—C bond, at the proper time, and for isomerization, although as pointed out, titanium oxide is unique in promoting even these reactions.

The primary reaction of dehydrogenation by the titanium oxide may be followed by isomerization and/or by scission by the cracking component i. e. the active kaolin and the hexanes, heptanes, octanes, etc. and corresponding olefins may be further dehydrogenated and/or cyclicized or in general undergo aromatization which together with the branched chain compounds resulting from isomerization form a high octane or highly anti-knock mixture of hydrocarbons most desirable for motor and aviation fuel.

It is also well established that intermediate compound hydrocarbons just formed or hydrocarbon radicals in a more or less nascent state are in a most active or reactive form, and my invention takes advantage of the simultaneous presence of these highly active groups and of the necessary catalytic components to direct the reactions towards the formation of the most desirable anti-knock compounds which otherwise would not be formed by the separately acting catalyst components either in space or time.

While the above series of reactions are not the only ones which occur they do show the general trend and explain the high percentage of both aromatic hydrocarbons and isomeric or branched chain aliphatic hydrocarbons in the product which is unique for my process.

Also, it can be understood from the above that when converting heavier hydrocarbon distillates or napthas which may be within the boiling range of motor fuel to the more desirable liquid hydrocarbons the above mechanism is one explanation of the superior results obtained by one with regard to yields and quality of product. The same general reactions may occur in reforming, i. e. conversion of liquid hydrocarbon within motor fuel boiling range although the sequence may not be the same, e. g. dehydrogenation of paraffins and dehydrocyclization (dehydrogenation followed by ring or aromatic hydrocarbon compound formation) of the olefins with simultaneous isomerization particularly of the latter hydrocarbons. Also when scission occurs of liquids within the gasoline boiling range dehydrogenation and polymerization of the resulting products may occur followed by the formation of isomeric or branched chain and aromatic hydrocarbons which are the desirable hydrocarbons for high octane motor and aviation fuel.

With regard to proportions of components of the catalysts I preferably employ up to about ten percent of titanium oxide preferably in the form of a gel and the remainder is made up of kaolin. However, I may employ up to 50% of the titanium oxide in varying degrees of activity. The catalysts may be used as pellets, pills, granules or powder depending on the process and/or equipment employed in their use or whether the stationary bed or moving catalysts are employed but in any event a thorough admixture of the components is desirable.

In some cases I may employ mixtures of the kaolin with various activated clays, hydrosilicates of aluminum, etc. (non-equivalently however) instead of the kaolin component, e. g. in the proportion, of 50 to 90 parts of the mixture containing a major amount of kaolin and the remainder consisting of titanium oxide. The minimum amount of titanium oxide used is not less than 1% (and preferably about 5%) and the maximum amount does not exceed 50%. Minor amounts of the oxides of chromium, vanadium and molybdenum e. g. up to 10% and generally not less than 1% of the catalyst, preferably in the form of a gel may be employed. These mixtures of course are not equivalent to the simple mixture of kaolin and titanium oxide.

In the preparation of the catalysts the best conventional methods may be employed, e. g. the metal oxides may be precipitated from solutions and deposited on the base for example, a hydrated oxide of titanium may be precipitated on the kaolin base and dried.

The catalyst may be employed in conventional catalytic cracking, reforming and/or hydroforming equipment, e. g. of the conventional stationary bed or moving bed or fluid flow or gas lift types.

The feed which may consist of light gas oil, kerosene or naptha where conversion to motor fuel is the objective or of straight run, thermally cracked or catalytically cracked gasoline or light napthas where reforming to improve octane number is the objective, may be preheated and vaporized and then passed through a catalyst containing chamber (or series of chambers) together if desired with preheated gas containing hydrogen which may be made in the process. The products are then cooled and fractionated and the liquid separated from the gases, the former being stabilized, and the latter scrubbed. The reflux from the fractionator may be recycled to produce further yields of gasoline and part of the gas from the separator may also be recycled. After a period of time the catalyst becomes fouled with carbon or coke and tars and one (or more) alternate chambers are provided to maintain continuous operation while the carbon and tars are burned off with air and/or steam. During this operation the temperature is kept below 1000° F. to 1100° F. or as low as possible.

Heat exchangers, recirculating pumps for fluids or molten solids, e. g. salts or low melt point metals, and other devices may be employed for heat control, recovery and economy.

The catalyst chambers and the system generally may be maintained at low superatmospheric pressures, e. g. of the order of 10 to 50 lbs. and upwards to 250 lbs. or more per square inch up to high pressures as desired. The conversion temperature may vary from 750° F. to 1050° F. or higher and generally between 800° F. to 1000° F. The space velocities may be from less than 1 to 10 volumes of liquid oil per volume of the catalyst per hour more or less.

Instead of the fixed bed operation one may employ the fluid flow process. In this the oil charge is vaporized and the finely divided catalyst introduced as a powder into the line carrying the vapor and thence through a perforated plate or grid at the bottom of the reaction chamber. The catalyst and vapors pass concurrently upward through the reaction chamber where the conversion takes place, and from the top of which the vapors and catalyst pass through cyclone separators where the spent catalyst are separated from the vapors and the latter fractionated into gasoline, heavier fractions, which may be recycled, gas, etc. The spent catalyst is reactivated by burning and is recycled into the system. The flow of catalyst through the conversion and reactivating system is continuous and the vapor-catalyst and catalyst-air mixtures, etc. are handled as fluids.

Similarly the catalysts may be handled mechanically or by gas lift methods. All of these methods of operation are now conventional.

With regard to yields and improvements in octane values obtainable by my process the following will serve as examples.

In connection with the examples it should be borne in mind that the process may be employed for the conversion of heavier oils to motor fuels and is especially adapted to improving the octane values of various motor fuels especially straight run napthas and gasolines as well as thermal and catalytically cracked napthas and gasolines or selected fractions thereof.

As a general example of conversion employing kerosene and light gas oil charging stocks the following may be cited. The range of temperatures for either may be from 850° F. to 900° F. from start to finish of the run with pressures of 10 to 50 p. s. i. averaging about 40 p. s. i. employing a catalyst containing 10% of titanium and 90% of kaolin; the yield of gasoline may range from 65% for the gas oil to 75% for the kerosene with octane values about 80 and up to 90 varying somewhat with the stock and the conditions of treatment; the kerosene giving the highest yields.

As a more specific example of the results obtainable by my process when employing a catalyst of kaolin containing about 10% of active titanium oxide, starting with a naptha of boiling range of about 200° F. to 400° F. with an A. S. T. M. octane number of 55 and employing a conversion temperature in the temperature range of 850° F. to 950° F. averaging about 925° F. with pressures of 10 to 50 lbs. per square inch averaging about 40 p. s. i., one may obtain a product with an initial boiling point of about 100° F. and maximum or end point of 380° F. having an A. S. T. M. octane number of 85 and in some cases up to 90 and a recovery of about 85%.

In another case employing the same catalyst shown in the first example and the same average temperature of 925° F. and average pressure of 40 p. s. i. cited in the preceding example starting with a straight run gasoline of 100° F. to 410° F. boiling range an increase in octane number of from 50 to 84 may be obtained with a loss of about 15%; and the octane number may be increased correspondingly with increased loss, e. g. a 22% loss may give a product of about 90 octane value, with the above catalyst.

In the three examples cited above the space velocity in all cases is less than 5.

In some cases octane values well exceeding 90 may be obtained by the treatment of straight run gasolines.

Similar results to those cited above may be obtained with the other types of catalysts, i. e. with the mixture containing activated hydrosilicates of aluminum and kaolin and titanium oxide with some of the other oxides mentioned above. Also the blending values of the products are higher than indicated for the products as such.

In general the octane values of straight run gasolines and napthas may show increases of 35 to 45 points in octane values when treated by my process with losses generally under 20% although the latter may be controlled. The reforming or finishing treatment of thermally cracked and catalytically cracked gasolines also show substantial increases in octane numbers to final values in some cases of over 90; with corresponding relatively low losses.

I may also apply as part of my invention the above processes and the catalysts mentioned herein to the treatment of gaseous hydrocarbons especially of a paraffinic character, e. g. propane and butanes, particularly the latter, which may be dehydrogenated and thereafter polymerized and/or isomerized.

It is of course to be understood owing to the large number of combinations and variations of my catalysts and processes that the examples are illustrative only and should therefore not be limiting on the broad scope and spirit of my invention.

I claim as my invention:

1. A process for the conversion of higher boiling to lower boiling hydrocarbons of high octane value and suitable for motor fuel which comprises subjecting the said hydrocarbons to conversion conditions of temperature and space velocities in the presence of a composited catalyst comprising an intimate and integrated mixture of kaolin and said added active titanium oxide, the active titanium oxide comprising from 1% to about 10% of the said mixture.

2. A process for the conversion of hydrocarbons to produce a product of high octane value and suitable for motor fuel which comprises subjecting the said hydrocarbons to conversion conditions of temperature in the range of about 800° F. to 1000° F. in the presence of a composited catalyst comprising an intimate and integrated mixture of kaolin comprising a major amount of kaolin, and a minor amount of the said titanium oxide, and added active titanium oxide and in addition dehydrogenating component of an oxide in the physical state of a gel selected from the group consisting of the active oxides of chromium, molybdenum and vanadium, the said oxides of chromium, molybdenum and vanadium consisting of more than 1% and less than 10% of the mixture.

3. A process for reforming hydrocarbons in the motor fuel boiling range to improve the octane value thereof which comprises subjecting the said hydrocarbons to conversion conditions of temperature and space velocities in the presence of a composited catalyst which comprises an intimate and integrated mixture of kaolin and added titanium oxide, the said titanium oxide comprising more than 1% and less than 50% of the said mixture.

4. A process for reforming hydrocarbons in the motor fuel boiling range to improve the octane value thereof which comprises subjecting the said hydrocarbons to conversion conditions of temperature in the range of about 800° F. to 1000° F. and space velocities in the presence of a composited catalyst which consists essentially of an intimate and integrated mixture of kaolin and added titanium oxide the said titanium oxide comprising more than 1% and less than 50% of the said mixture and in the presence of an added hydrogen containing gas.

5. A process for reforming hydrocarbons in the motor fuel boiling range to improve the octane value thereof which comprises subjecting the said hydrocarbons to conversion conditions of temperature in the range of about 800° F. to 1000° F. and space velocities of the order of less than ten volumes of liquid oil per volume of catalyst per hour in the presence of a composited catalyst comprising in intimate and integrated mixture of kaolin and added active titanium oxide the said active titanium oxide comprising from more than 1% to about 10% of the said mixture and in the presence of an added hydrogen containing gas.

6. A process for the conversion of higher boiling to lower boiling hydrocarbons of high octane value and suitable for motor fuel which comprises subjecting the said hydrocarbons to conversion conditions of temperature and space velocities in the presence of a composited catalyst which comprises an intimate and integrated mixture of kaolin, hydrosilicates of alumina and added titanium oxide the said titanium oxide comprising more than 1% and less than 50% of the said mixture.

7. A process for reforming hydrocarbons in the motor fuel boiling range to improve the octane value thereof which comprises subjecting the said hydrocarbons to conversion conditions of temperature and space velocities in the presence of a composited catalyst comprising an intimate and integrated mixture of a major proportion of kaolin and added active titanium oxide, and a dehydrogenating component of an oxide in the physical state of a gel selected from the group consisting of the active oxides of chromium, molybdenum and vanadium, the said oxides of chromium, molybdenum and vanadium, consisting of more than 1% and less than 10% of the mixture.

8. A process for reforming hydrocarbons in the motor fuel boiling range to improve the octane value thereof which comprises subjecting the said hydrocarbons to conversion conditions of temperature and space velocities in the presence of a composited catalyst comprising an intimate and integrated mixture of active kaolin and a titanium oxide gel the said titanium oxide gel comprising from 1% to about 10% of the said mixture and in the presence of an added hydrogen containing gas.

9. A process for the conversion of hydrocarbons to produce a product of high octane value and suitable for motor fuel which comprises subjecting the said hydrocarbons to conversion conditions of temperature and space velocities in the presence of a composited catalyst which comprises an intimate and integrated mixture of kaolin and another active clay and added titanium oxide the said titanium oxide comprising more than 1% and less than 50% of the said mixture.

10. A process for the conversion of higher boiling to lower boiling hydrocarbons of high octane value, and suitable for motor fuel which comprises subjecting the said hydrocarbons to conversion conditions of temperatures and space velocities in the presence of a composited catalyst comprising an intimate and integrated mixture of kaolin and added titanium oxide, the said added titanium oxide comprising more than 1% and less than about 50% of the said mixture.

11. A process for the conversion of higher boiling to lower boiling hydrocarbons of high octane value and suitable for motor fuel which comprises subjecting the said hydrocarbons to conversion conditions of temperature in the range of about 800° F. to 1000° F. in the presence of a composited catalyst comprising an intimate and integrated mixture of kaolin and added active titanium oxide, the said added titanium oxide comprising more than 1% and less than about 50% of the said mixture.

12. A process for the conversion of higher boiling to lower boiling hydrocarbons of high octane value and suitable for motor fuel which comprises subjecting the said hydrocarbons to conversion conditions of temperature in the range of about 800° F. to 1000° F. and space velocities of the order of less than ten volumes of liquid oil per volume of catalyst per hour in the presence of a composited catalyst comprising an intimate and integrated mixture of kaolin and titanium oxide added in the physical state of a gel the said added titanium oxide gel comprising from 1% to about 10%, and the said kaolin comprising the major component of the said mixture.

References Cited in the file of this patent

UNITED STATES PATENTS

| | | |
|---|---|---|
| 2,356,576 | Free et al. | Aug. 22, 1944 |
| 2,414,812 | Houdry | Jan. 28, 1947 |
| 2,437,531 | Huffman | Mar. 9, 1948 |
| 2,440,756 | Oulton | May 4, 1948 |
| 2,466,051 | Shabaker et al. | Apr. 5, 1949 |
| 2,485,626 | Mills | Oct. 25, 1949 |
| 2,494,586 | Shabaker | Jan. 17, 1950 |
| 2,504,158 | Shabaker | Apr. 18, 1950 |